United States Patent
Yamane et al.

(10) Patent No.: US 10,442,387 B2
(45) Date of Patent: Oct. 15, 2019

(54) VEHICLE AIRBAG APPARATUS

(71) Applicant: SUBARU CORPORATION, Tokyo (JP)

(72) Inventors: Kazuya Yamane, Tokyo (JP); Takashi Kamibayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 81 days.

(21) Appl. No.: 15/872,249

(22) Filed: Jan. 16, 2018

(65) Prior Publication Data

US 2018/0272974 A1   Sep. 27, 2018

(30) Foreign Application Priority Data

Mar. 27, 2017   (JP) ................. 2017-060641

(51) Int. Cl.
*B60R 21/232* (2011.01)
*B60R 21/2338* (2011.01)
(Continued)

(52) U.S. Cl.
CPC ........ *B60R 21/232* (2013.01); *B60R 21/0132* (2013.01); *B60R 21/213* (2013.01);
(Continued)

(58) Field of Classification Search
CPC . B60R 21/0132; B60R 21/213; B60R 21/232; B60R 21/2338; B60R 2021/0009;
(Continued)

(56) References Cited

U.S. PATENT DOCUMENTS 7,172,212 B2   2/2007   Aoki et al.
9,254,805 B2   2/2016   Park et al.
(Continued)

FOREIGN PATENT DOCUMENTS

CN   1751918 A   3/2006
CN   104670148 A   6/2015
(Continued)

OTHER PUBLICATIONS

Decision to Grant a Patent received Oct. 2, 2018 in Japanese Patent Application No. 2017-060641 (3 pages in Japanese with English Machine Translation).
(Continued)

*Primary Examiner* — Ruth Ilan
(74) *Attorney, Agent, or Firm* — Smith, Gambrell & Russell, LLP (57) ABSTRACT

A vehicle airbag apparatus includes a curtain airbag, a collision direction detector, a deployment inhibitor, and an airbag controller. The curtain airbag is deployable in an interior of a vehicle from an upper portion on a side of the vehicle so as to cover a side window of the vehicle. The collision direction detector detects a collision direction of a collision object and the vehicle. The deployment inhibitor partially suppresses deployment of the curtain airbag. In response to the collision direction detector detecting a substantially forward collision of the vehicle, the airbag controller deploys the curtain airbag in such a manner as to activate the deployment inhibitor to suppress deployment of the curtain airbag over an area interfering with an extending portion of a seat belt being worn by an occupant.

5 Claims, 6 Drawing Sheets

(51) Int. Cl.
  *B60R 21/0132* (2006.01)
  *B60R 21/213* (2011.01)
  *B60R 21/01* (2006.01)
  *B60R 21/00* (2006.01)

(52) U.S. Cl.
  CPC .. *B60R 21/2338* (2013.01); *B60R 2021/0009* (2013.01); *B60R 2021/01286* (2013.01); *B60R 2021/23386* (2013.01); *B60R 2021/23388* (2013.01)

(58) Field of Classification Search
  CPC  B60R 2021/01286; B60R 2021/23386; B60R 2021/23388
  See application file for complete search history.

(56) References Cited

U.S. PATENT DOCUMENTS

| | | | |
|---|---|---|---|
| 2005/0116450 A1* | 6/2005 | Noguchi | B60R 21/232 280/730.2 |
| 2006/0061074 A1 | 3/2006 | Aoki et al. | |
| 2008/0277913 A1* | 11/2008 | Jessup | B60R 21/232 280/743.2 |
| 2014/0265270 A1* | 9/2014 | Wang | B60R 21/237 280/730.2 |
| 2015/0097360 A1 | 4/2015 | Ochiai et al. | |
| 2016/0023626 A1* | 1/2016 | Hiruta | B60R 21/232 280/728.2 |
| 2016/0039384 A1 | 2/2016 | Fukawatase et al. | |
| 2016/0185314 A1 | 6/2016 | Kawamura et al. | |
| 2016/0280177 A1* | 9/2016 | Young | B60R 21/232 |
| 2016/0311392 A1 | 10/2016 | Jindal et al. | |

FOREIGN PATENT DOCUMENTS

| | | |
|---|---|---|
| DE | 20216338 U1 | 2/2003 |
| JP | 2005-239038 A | 9/2005 |
| JP | 2006-160066 A | 6/2006 |
| JP | 2007-062599 A | 3/2007 |
| JP | 4313277 B2 | 8/2009 |
| JP | 2010-159026 A | 7/2010 |
| JP | 2010-247661 A | 11/2010 |
| JP | 2016-037240 A | 3/2016 |
| WO | 2013-161626 A1 | 10/2013 |

OTHER PUBLICATIONS

Office Action received in Chinese Patent Application No. 201711336802.X dated Feb. 22, 2019 (4 pages in Chinese with English translation).

Search Report received in Chinese Patent Application No. 201711336802.X dated Feb. 13, 2019 (3 pages).

* cited by examiner

VEHICLE AIRBAG APPARATUS

CROSS-REFERENCE TO RELATED APPLICATIONS

The present application claims priority from Japanese Patent Application No. 2017-060641 filed on Mar. 27, 2017, the entire contents of which are hereby incorporated by reference.

BACKGROUND

1. Technical Field

The present invention relates to vehicle airbag apparatuses, and more specifically to a vehicle airbag apparatus including a curtain airbag that is deployed in the interior of a vehicle from an upper portion of the vehicle so as to cover a side window of the vehicle.

2. Related Art

Curtain airbags deployed in the interior of a vehicle to cover side windows of the vehicle have become increasingly prevalent in recent years to protect occupants during a side collision of the vehicle in a crash or the like. Among vehicle airbag apparatuses including such curtain airbags, a vehicle airbag apparatus disclosed in Japanese Patent (JP-B) No. 4313277 includes a curtain airbag that has a slit in a portion thereof that interferes with a seat belt. The seat belt goes into the slit during deployment of the curtain airbag, which allows the curtain airbag to deploy without being interfered with by the seat belt.

Recently, attention has been focused on protecting occupants from a substantially forward collision (which is distinguished from a head-on collision) of a vehicle, such as a small-overlap collision or an oblique collision. In such a substantially forward collision of a vehicle, for instance, an occupant on the impact side may move forward and outward in a vehicle width direction. A curtain airbag that is deployed in the interior of the vehicle to cover a side window of the vehicle is thus suitable for use in the protection of an occupant from a substantially forward collision of the vehicle. A typical curtain airbag deploys from a roof side rail or the like in an upper portion on a side of the vehicle and may interfere with a seat belt that is pulled substantially forward as the occupant wearing the seat belt moves substantially forward. As a result, the curtain airbag may experience a problem when deploying. However, in the absence of the curtain airbag, or an airbag that regulates movement of an occupant to the side of the vehicle, in an area interfering with an extending portion of the seat belt, the occupant may not be sufficiently protected in a side collision of the vehicle.

SUMMARY OF THE INVENTION

It is desirable to provide a vehicle airbag apparatus capable of deploying a curtain airbag without a problem in a substantially forward collision of a vehicle and capable of reliably protecting an occupant in a side collision of the vehicle.

An aspect of the present invention provides a vehicle airbag apparatus including a curtain airbag, a collision direction detector, a deployment inhibitor and an airbag controller. The curtain airbag is deployable in an interior of a vehicle from an upper portion on a side of the vehicle so as to cover a side window of the vehicle. The collision direction detector is configured to detect a collision direction of a collision object and the vehicle, a deployment inhibitor configured to partially suppress deployment of the curtain airbag. The airbag controller is configured to, in response to the collision direction detector detecting a substantially forward collision of the vehicle, deploy the curtain airbag in such a manner as to activate the deployment inhibitor to suppress deployment of the curtain airbag over an area interfering with an extending portion of a seat belt being worn by an occupant.

Another aspect of the present invention provides a vehicle airbag apparatus including a curtain airbag, a detector and circuitry. The curtain airbag is deployable in an interior of a vehicle from an upper portion on a side of the vehicle so as to cover a side window of the vehicle. The detector is configured to detect a collision direction of a collision object and the vehicle. The circuitry is configured to partially suppress deployment of the curtain airbag. The circuitry is configured to, in response to the detector detecting a substantially forward collision of the vehicle, deploy the curtain airbag in such a manner as to suppress deployment of the curtain airbag over an area interfering with an extending portion of a seat belt being worn by an occupant.

DETAILED DESCRIPTION

Figure 1:
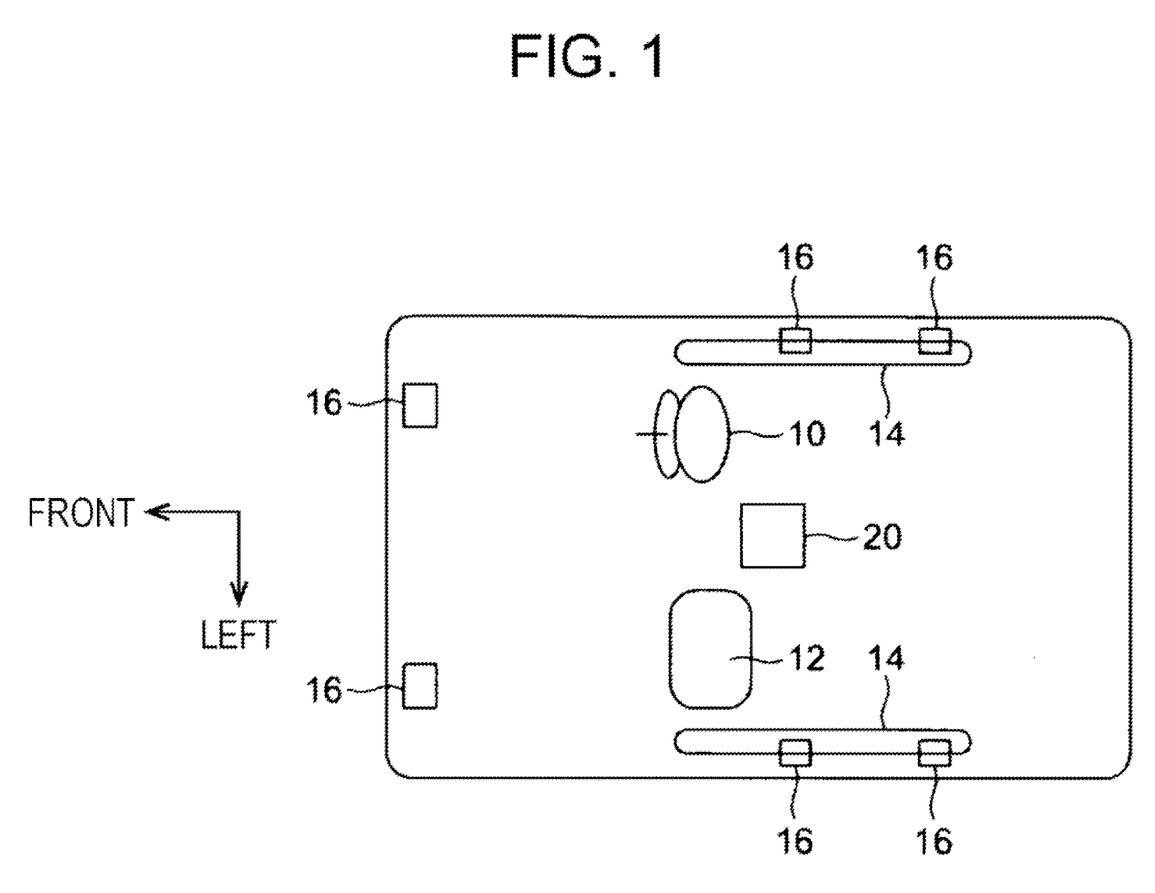
FIG. 1 is a schematic plan view of a vehicle including a vehicle airbag apparatus according to an example of the present invention.

A vehicle airbag apparatus according to an example of the present invention will be described in detail hereinafter with reference to the drawings. FIG. 1 is a schematic plan view of a vehicle including the vehicle airbag apparatus according to the example. The vehicle is, for instance, a station wagon vehicle having a passenger compartment in which a plurality of airbags are disposed to protect occupants when the vehicle collides with a collision object. In the example, for instance, a driver seat airbag 10 is disposed in a center portion (boss) of a steering wheel, and a passenger seat airbag 12 is disposed in a dashboard (instrument panel) in front of a front passenger seat. In addition, a curtain airbag 14 that is deployed in the interior of the vehicle so as to cover either side window of the vehicle is disposed along a roof side rail from an A-pillar (front pillar) to a C-pillar (rear quarter pillar), for instance.

The airbags 10, 12, and 14, which are illustrated as being in their deployed state, are usually kept stowed away in the vehicle. The driver seat airbag 10 and the passenger seat airbag 12 deploy rearward, and the curtain airbags 14 deploy downward from upper portions on the sides of the vehicle. As described below, the driver seat airbag 10 and the passenger seat airbag 12 are deployed mainly in a head-on collision of the vehicle, and the curtain airbags 14 are deployed mainly in a side collision of the vehicle. In the example, the curtain airbags 14, the driver seat airbag 10, and the passenger seat airbag 12 are deployed simultaneously in a substantially forward collision. The driver seat airbag 10 and the passenger seat airbag 12 are also referred to as head-on collision airbags.

The term "substantially forward collision of a vehicle", as used herein, refers to a collision of a portion of the vehicle that is off the front part of the vehicle, called a small-overlap collision or an oblique collision, for instance. Such a substantially forward collision is defined as being different than a head-on collision (a collision of the front part of the vehicle) such as a full-wrap frontal collision or an offset frontal collision.

The vehicle is also provided with a plurality of sensors 16 for detecting a collision direction (collision state) of a collision object and the vehicle. In the example, for instance, acceleration sensors are used to detect a collision direction of a collision object and the vehicle. However, other types of sensors may be used to detect the collision direction. In the example, the sensors 16, which serve as collision direction detectors, are disposed on both ends of a front bumper in the vehicle width direction, that is, on the two, left and right sides on the front of the vehicle, and in a total of four locations at the B-pillar and C-pillar positions on the side structure forming both sides of the vehicle. The collision state of the vehicle is detected from output signals of the sensors 16 by using, as known in the art, for instance, differences between the magnitudes of the outputs of the left and right acceleration sensors to determine the occurrence of a collision such as a full-wrap frontal collision, an offset frontal collision, a small-overlap collision, or an oblique collision. As described above, a small-overlap collision and an oblique collision are regarded as substantially forward collisions, and a full-wrap frontal collision and an offset frontal collision are regarded as head-on collisions.

Figure 2A:
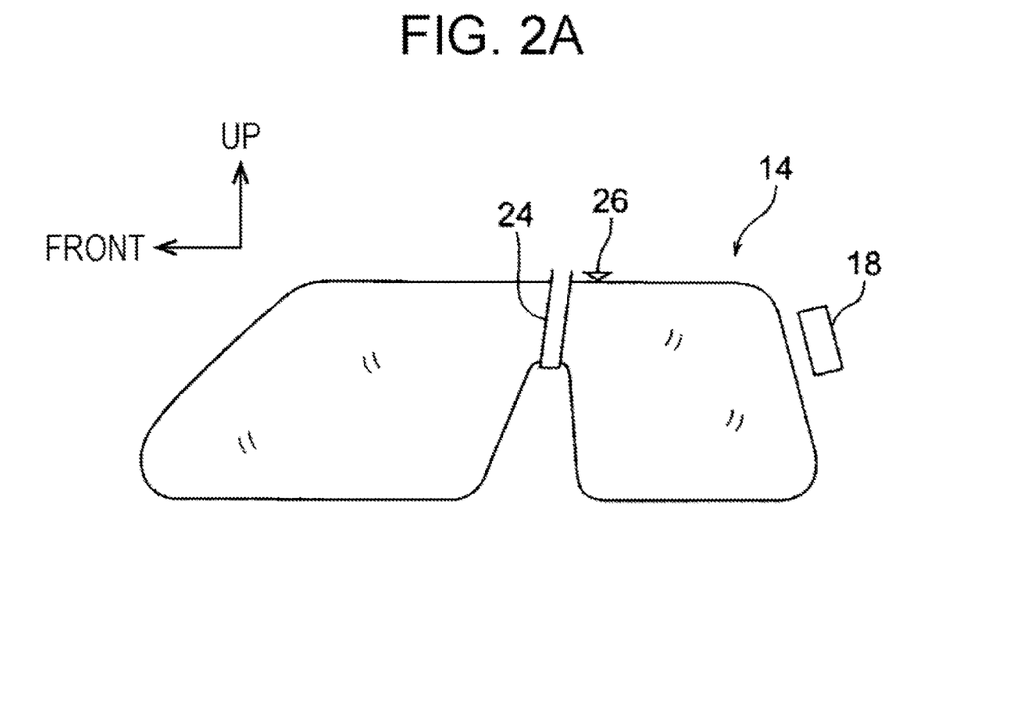
FIGS. 2A and 2B illustrate an example of a curtain airbag and a deployment inhibitor included in the vehicle illustrated in FIG. 1.
Figure 2B:
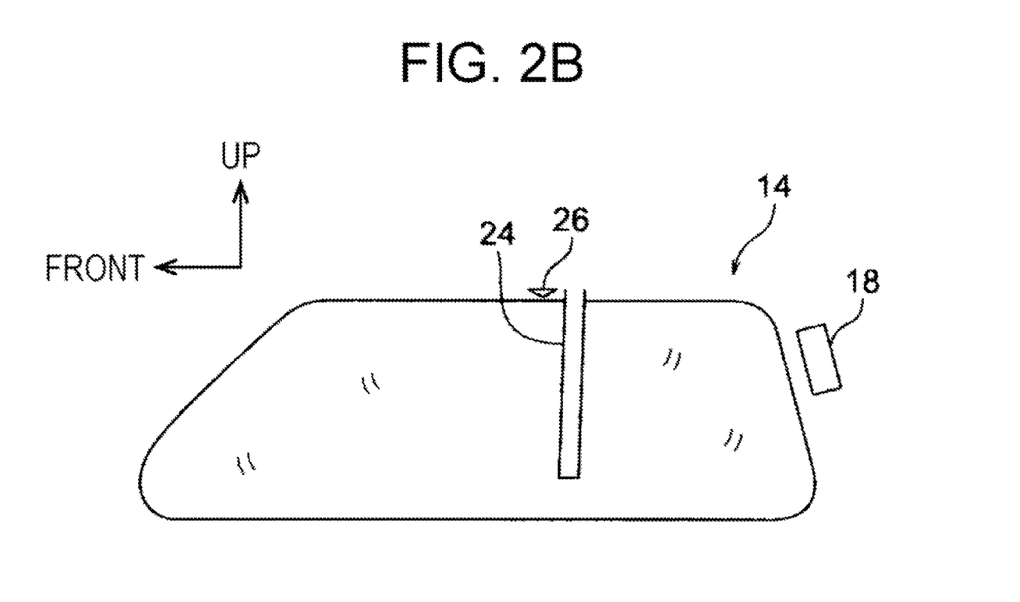

For instance, as illustrated in FIGS. 2A and 2B, each airbag is coupled to a known gas generator 18, called an inflator. The operating state of the gas generator 18 is controlled by using an electrical signal from an airbag control unit 20. The airbag control unit 20 is provided with an arithmetic processing unit such as a microcomputer and has high arithmetic processing capabilities. To this end, like a computer system, the airbag control unit 20 includes an input/output unit, a storage unit, and so on in addition to the arithmetic processing unit. As in recent vehicles, the airbag control unit 20 is also configured to mutually communicate with control units included in other vehicles to perform control in cooperation with the control units or to exchange or share information. The airbag control unit 20 is also capable of controlling the operating states of actuators other than the gas generator 18 by using electrical signals.

Each of the curtain airbags 14 according to the example is provided with, for instance, a deployment inhibitor to suppress the deployment over an area interfering with a corresponding one of seat belts being worn by occupants in the driver seat and the front passenger seat. For instance, in a side collision (or a substantially side collision) of the vehicle, the occupants in the driver seat and the front passenger seat fundamentally move only in the vehicle width direction. Thus, as in JP-B No. 4313277 noted above, the curtain airbags 14 may be each provided with a slit in a portion thereof that interferes with the corresponding one of the seat belts being worn by the occupants so as to allow the seat belt to go into the slit. In a side collision of the vehicle, the curtain airbags 14 are desirably deployed so as to cover entire portions of the side windows of the vehicle to protect the occupants even when the windows are open. However, in a substantially forward collision such as a small-overlap collision or an oblique collision, the occupants in the driver seat and the front passenger seat may move forward and, furthermore, the occupant on the impact side may also move outward in the vehicle width direction. In this case, one of the curtain airbags 14 that is deployed in order to protect the occupant who moves outward in the vehicle width direction is deployed from the upper portion on the side of the vehicle and may interfere with the seat belt 22 that extends as the occupant moves forward over a wider area (see FIG. 7). As a result, the curtain airbag 14 can experience a problem when deploying. In the example, accordingly, in a substantially forward collision, the deployment of the curtain airbag 14 is suppressed in an area interfering with an extending portion of the seat belt 22 that extends in accordance with movement of the occupant (hereinafter also referred to simply as the area interfering with the seat belt 22), in particular, in an area in the forward-rearward direction.

As the deployment inhibitor, an example of which is illustrated in FIGS. 2A and 2B, the area interfering with the seat belt 22 is restrained with a tether (tether strap) 24. In this instance, as illustrated in FIG. 2A, a portion of the curtain airbag 14 deployed from the upper portion interferes with the seat belt 22 (not illustrated), and this portion is retained in such a manner as to be lifted by the tether 24 to suppress the deployment. In this instance, the tether 24 is cut with a tether cutter 26. As illustrated in FIG. 2B, for instance, in a side collision of the vehicle, an actuator (not illustrated) activates the tether cutter 26 to cut the tether 24 to disable the tether 24 to cancel suppression of the deployment. As a result, the curtain airbag 14 is deployed so as to cover an entire portion of the side window of the vehicle.

Figure 3A:
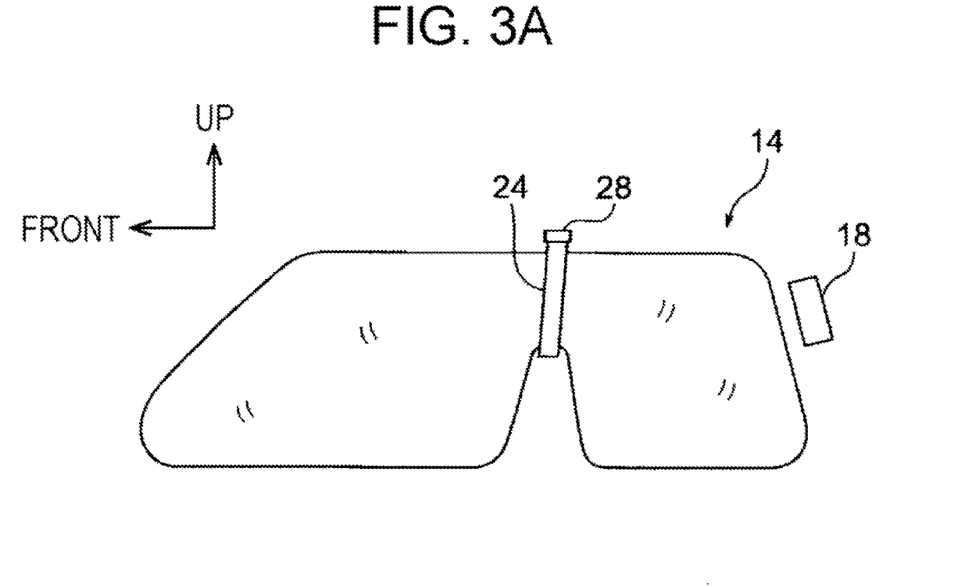
FIGS. 3A and 3B illustrate another example of the curtain airbag and the deployment inhibitor included in the vehicle illustrated in FIG. 1.
Figure 3B:
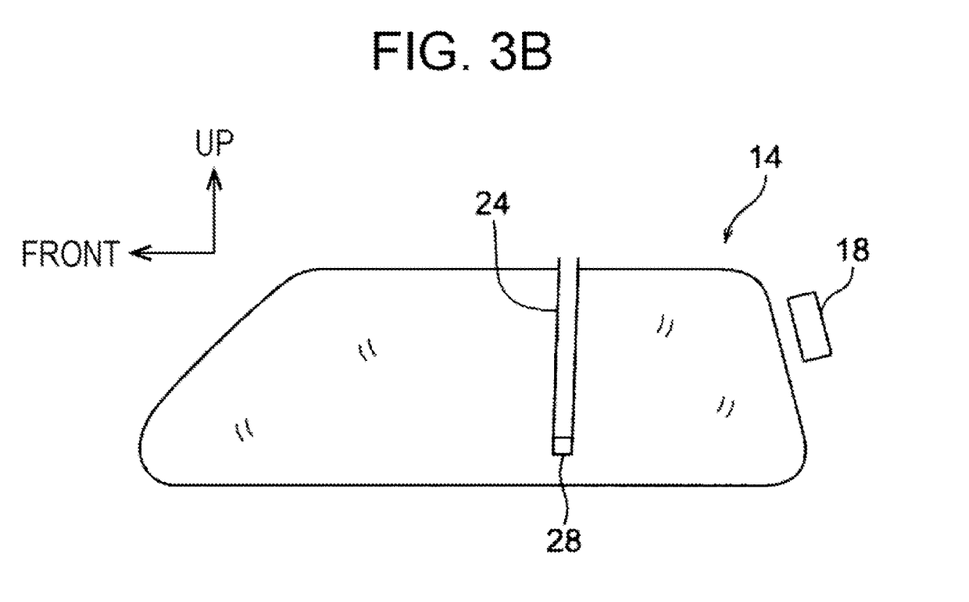

FIGS. 3A and 3B illustrate another instance of the curtain airbag deployment inhibitor. In the illustrated instance, as in FIG. 2A, a portion of the curtain airbag 14 deployed from the upper portion interferes with the seat belt 22 (not illustrated), and this portion is retained in such a manner as to be lifted by the tether 24 to suppress the deployment. In the illustration, for instance, a tether anchor 28 is used instead of the tether cutter 24. The tether anchor 28 is attachable to a base of the roof side rail from which the tether 24 is hung. For instance, in a side collision of the vehicle, as illustrated in FIG. 3B, an actuator (not illustrated) causes the tether anchor 28 to be detached from the base from which the tether 24 is hung to disable the tether 24 to cancel suppression of the deployment. As a result, the curtain airbag 14 is deployed so as to cover an entire portion of the side window of the vehicle.

Figure 4A:
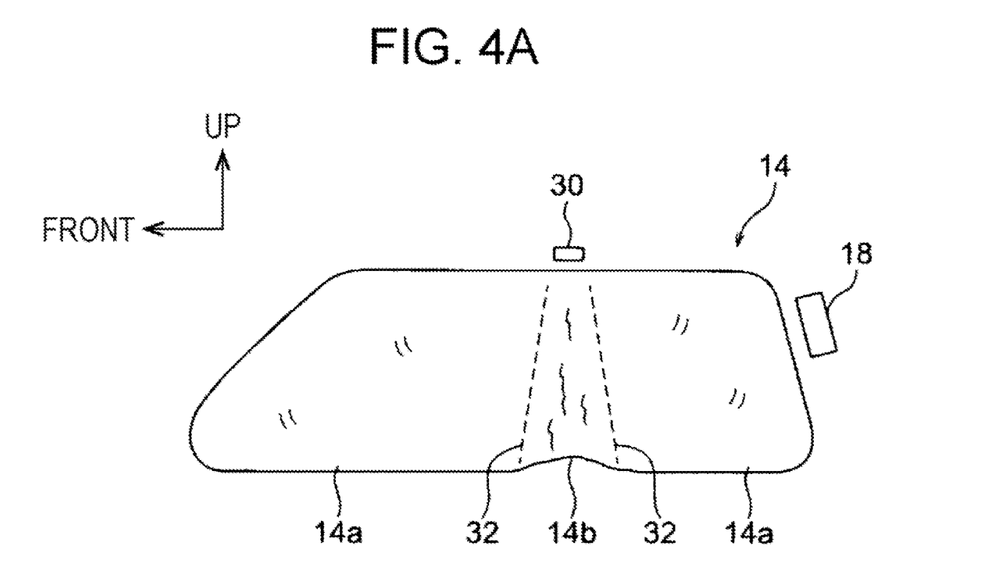
FIGS. 4A and 4B illustrate still another example of the curtain airbag and the deployment inhibitor included in the vehicle illustrated in FIG. 1.
Figure 4B:
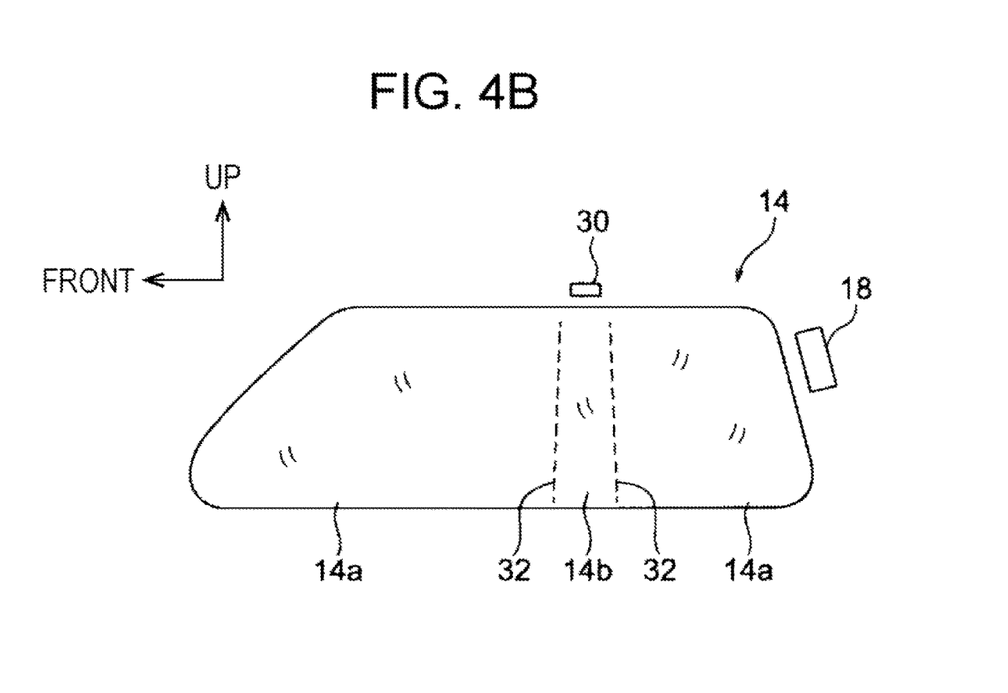

FIGS. 4A and 4B illustrate still another instance of the curtain airbag deployment inhibitor. In the illustrated instance, the curtain airbag 14, which is formed into a continuous shape, for instance, is sectioned into an area interfering with the seat belt 22 (not illustrated) and areas not interfering with the seat belt 22 by seams 32, for instance, to obtain a multiple-cell structure. An interference cell 14b in the area interfering with the seat belt 22 has a gas inlet through which gas from the gas generator 18 flows, and an opening-closing valve 30 serving as a deployment inhibitor is disposed at the gas inlet. In a substantially forward collision, the opening-closing valve 30 is closed. Thus, as illustrated in FIG. 4A, gas flows into only non-interference cells 14a in the areas not interfering with the seat belt 22 to deploy the non-interference cells 14a. Consequently, no gas flows into the interference cell 14b in the area interfering with the seat belt 22, and the deployment of the interference cell 14b is suppressed. In this case, the material of the curtain airbag 14 is moved to a seat belt extending portion. However, the interference cell 14b in the area interfering with the seat belt 22 does not deploy, and the material of the curtain airbag 14 has substantially no force exerted if it comes into contact with the seat belt 22. There occurs no problem with the deployment of the non-interference cells 14a in the areas not interfering with the seat belt 22. In a side collision, the opening-closing valve 30 is opened. Thus, as illustrated in FIG. 4B, gas from the gas generator 18 also flows into the interference cell 14b in the area interfering with the seat belt 22 during a substantially forward collision to cancel suppression of the deployment using the opening-closing valve 30. As a result, the curtain airbag 14 is deployed so as to cover an entire portion of the side window of the vehicle.

Figure 5:
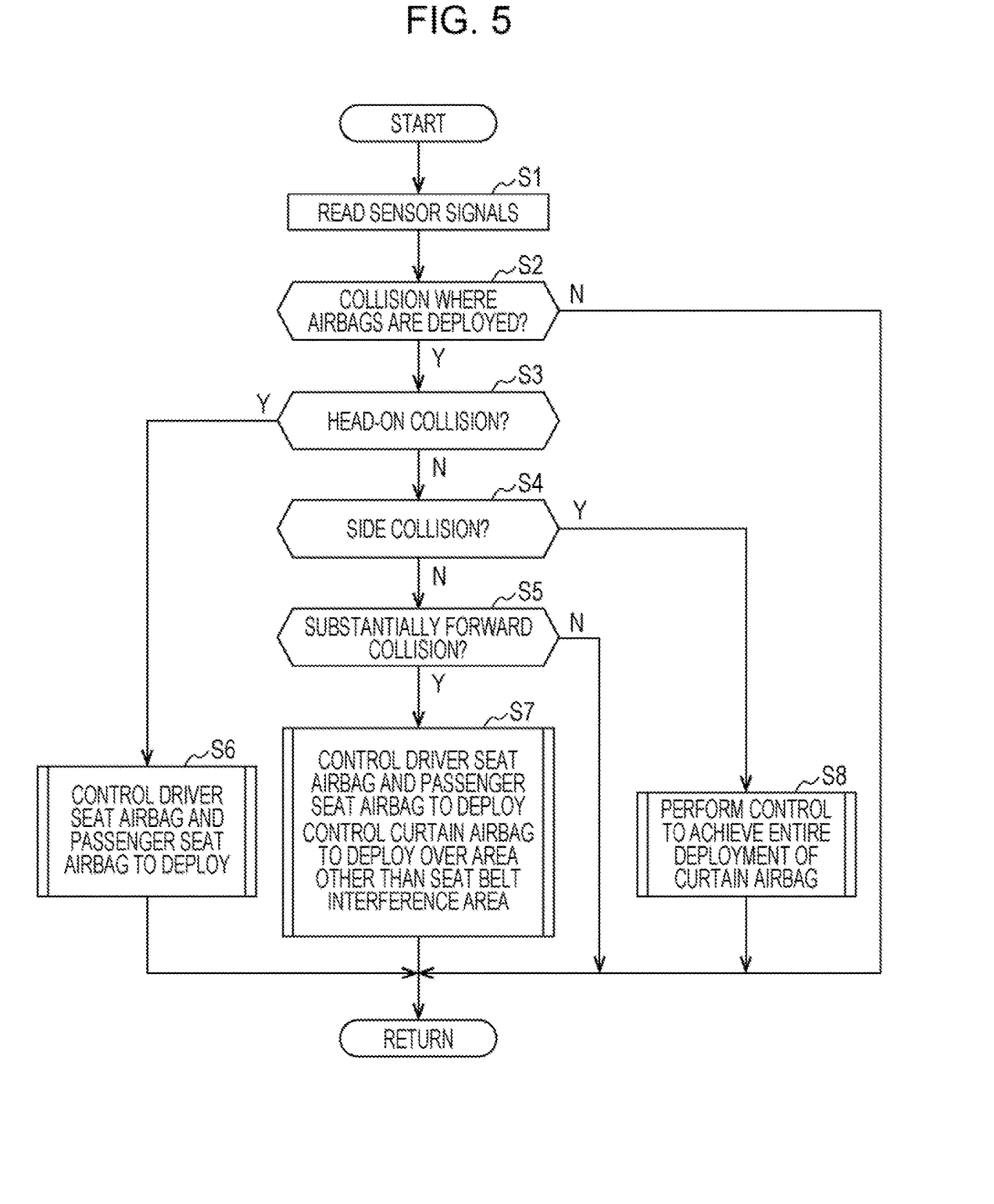
FIG. 5 is a flowchart of arithmetic processing executed by an airbag control unit illustrated in FIG. 1.

FIG. 5 is a flowchart of arithmetic processing executed by the airbag control unit 20. The arithmetic processing is executed by using, for instance, a timer interrupt process at intervals of a preset sampling period. First, in step S1, the airbag control unit 20 reads sensor signals from the sensors 16 described above.

Then, in step S2, for instance, the airbag control unit 20 determines whether the magnitude of each of the sensor signals from the sensors 16 is greater than or equal to a preset value to determine whether a collision where airbags are deployed has occurred. If a collision where airbags are deployed has occurred, the process proceeds to step S3, or otherwise, the process exits.

In step S3, for instance, the airbag control unit 20 determines whether only sensor signals from the sensors 16 on the front bumper have been input to determine whether a head-on collision has occurred. If a head-on collision has occurred, the process proceeds to step S6, or otherwise, the process proceeds to step S4.

In step S4, for instance, the airbag control unit 20 determines whether only sensor signals from the sensors 16 on the side structure have been input to determine whether a side collision has occurred. If a side collision has occurred, the process proceeds to step S8, or otherwise, the process proceeds to step S5.

In step S5, for instance, the airbag control unit 20 determines whether the difference between the magnitudes of the sensor signals from the left and right sensors 16 on the front bumper is greater than or equal to a preset value to determine whether a substantially forward collision has occurred. If a substantially forward collision has occurred, the process proceeds to step S7, or otherwise, the process exits.

In step S6, the airbag control unit 20 controls the driver seat airbag 10 and the passenger seat airbag 12 to deploy in accordance with individual arithmetic processing (not illustrated). Then, the process exits.

In step S7, the airbag control unit 20 controls the driver seat airbag 10 and the passenger seat airbag 12 to deploy in accordance with individual arithmetic processing (not illustrated). In addition, the airbag control unit 20 controls the curtain airbag 14 to deploy over an area other than a seat belt interference area in accordance with individual arithmetic processing (not illustrated). That is, the curtain airbag 14 is deployed in such a manner that the deployment inhibitor described above is activated to suppress the deployment of the curtain airbag 14 over the area interfering with the seat belt 22. Then, the process exits.

In step S8, the airbag control unit 20 performs control to achieve entire deployment of the curtain airbag 14 in accordance with individual arithmetic processing (not illustrated). That is, the curtain airbag 14 is deployed in such a manner that the deployment inhibitor described above is disabled to cancel suppression of the deployment of the curtain airbag 14 over the area interfering with the seat belt 22. Then, the process exits.

Figure 6:
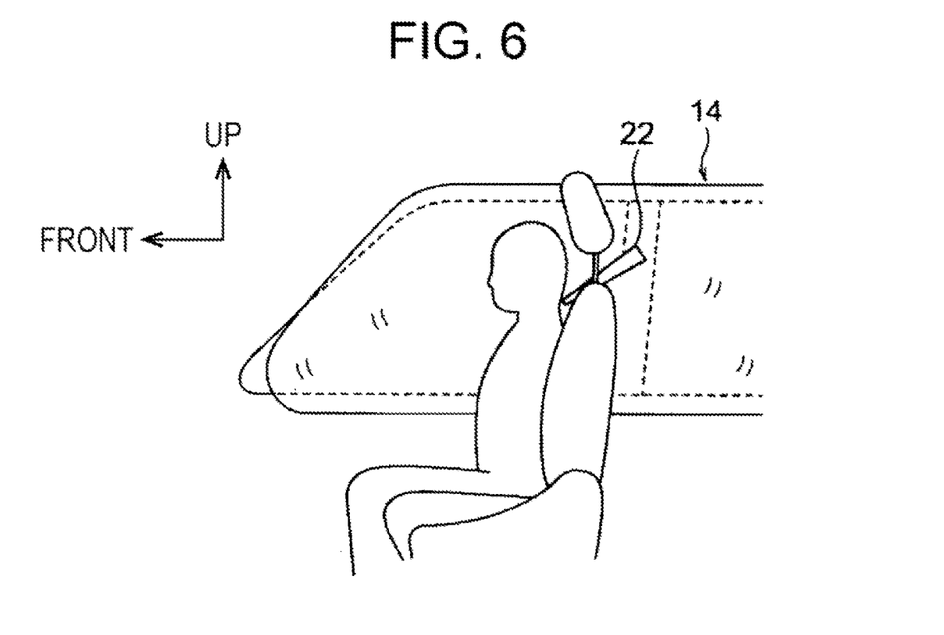
FIG. 6 is a diagram describing the effect of the arithmetic processing illustrated in FIG. 5.

In the arithmetic processing, if a head-on collision of the vehicle is detected based on detection signals from the sensors 16, the head-on collision airbags, namely, the driver seat airbag 10 and the passenger seat airbag 12, are deployed to protect the occupants. If a side collision of the vehicle is detected, control is performed to achieve entire deployment of the curtain airbag 14 to cover an entire portion of either side window. That is, deployment control to disable the deployment inhibitor is performed. As a result, as illustrated in FIG. 6, entire deployment of the curtain airbag 14 is achieved without partial disabling of deployment. This ensures that an occupant can be protected against a side collision of the vehicle.

Figure 7:
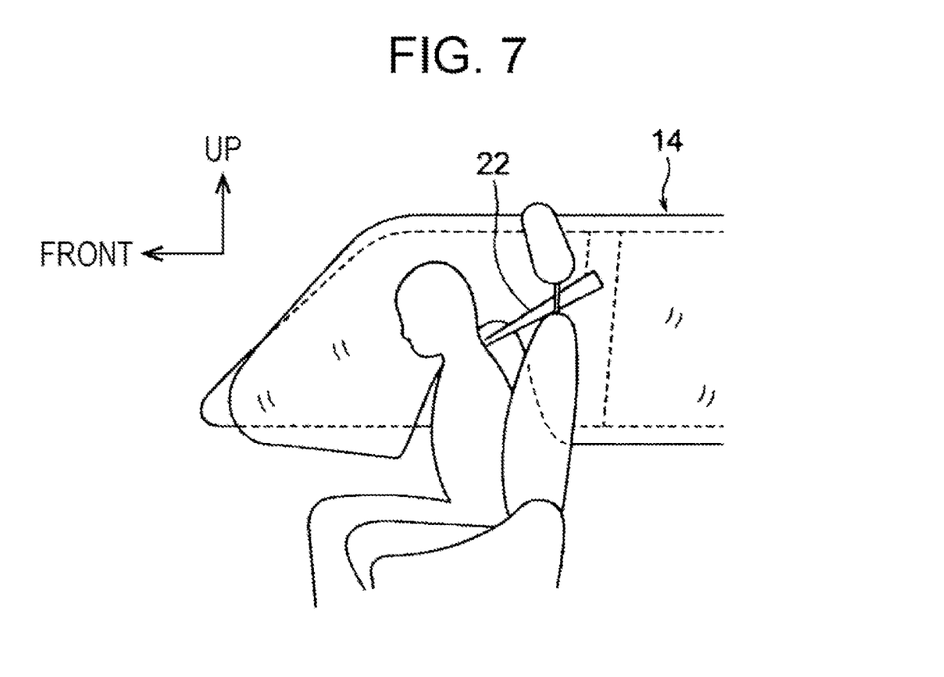
FIG. 7 is a diagram describing the effect of the arithmetic processing illustrated in FIG. 5.

If a substantially forward collision of the vehicle is detected, the head-on collision airbags are controlled to deploy and each of the curtain airbags 14 is controlled to deploy over an area other than a seat belt interference area. In the deployment of each of the curtain airbags 14 over an area other than the seat belt interference area, the deployment inhibitor described above suppresses the deployment of the curtain airbag 14 over the area interfering with the seat belt 22. Accordingly, in a substantially forward collision of the vehicle, as illustrated in FIG. 7, interference between the curtain airbag 14 and an extending portion of the seat belt 22 that extends in accordance with the substantially forward movement of the occupant is avoided. As a result, there is no problem with the deployment of the curtain airbag 14 over the other area. In a substantially forward collision of the vehicle, furthermore, the head-on collision airbags, namely, the driver seat airbag 10 and the passenger seat airbag 12, are deployed simultaneously and, as a result, for instance, an occupant who moves forward and outward in the vehicle width direction can be protected in such a manner as to be cushioned by the head-on collision airbags and the curtain airbags 14.

In the example, accordingly, a collision direction of a collision object and the vehicle is detected by using the sensors 16. Only when a substantially forward collision of the vehicle is detected from the detection signals of the sensors 16, each of the curtain airbags 14 is deployed in such a manner as to activate the deployment inhibitor to suppress the deployment of the curtain airbag 14 over an area interfering with an extending portion of the seat belt 22 being worn by an occupant. This configuration can avoid a problem with the deployment of the curtain airbags 14 in a substantially forward collision of the vehicle.

When a side (substantially side) collision of the vehicle is detected from the detection signals of the sensors 16, each of the curtain airbags 14 is deployed in such a manner that the deployment inhibitor is disabled to cancel suppression of the deployment of the curtain airbag 14 over the area interfering with the extending portion of the seat belt 22. This configuration can ensure that an occupant can be protected against a side collision.

When a substantially forward collision of the vehicle is detected, the curtain airbags 14 and the head-on collision airbags such as the driver seat airbag 10 and the passenger seat airbag 12 are deployed. This configuration enables occupants who move forward and outward in the vehicle width direction during a substantially forward collision to be protected in such a manner that the occupants are cushioned by the head-on collision airbags and the curtain airbags 14.

A variety of techniques other than that in the example described above may be applied to a deployment inhibitor that suppresses deployment of a curtain airbag that interferes with an extending portion of a seat belt that extends as an occupant moves substantially forward in a substantially forward collision of the vehicle.

In the example described above, the curtain airbags 14 are deployed so as to cover entire portions of the side windows of the vehicle in a side collision of the vehicle. Alternatively, the area over which each of the curtain airbags 14 deploys in a side collision of the vehicle may be set individually for each vehicle.

It is to be understood that the present invention embraces a variety of examples and the like that are not described herein. The technical scope of the present invention is defined by reference to the appended claims.

The airbag control unit 20 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the airbag control unit 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle airbag apparatus comprising:
 a curtain airbag deployable in an interior of a vehicle from an upper portion on a side of the vehicle so as to cover a side window of the vehicle;
 a collision direction detector configured to detect a collision direction of a collision object and the vehicle;
 a deployment inhibitor configured to partially suppress deployment of the curtain airbag; and
 an airbag controller configured to, in response to the collision direction detector detecting a substantially forward collision of the vehicle, deploy the curtain air bag in such a manner as to activate the deployment inhibitor to suppress deployment of the curtain airbag over an area interfering with an extending portion of a seat belt being worn by an occupant.

2. The vehicle airbag apparatus according to claim 1, further comprising a head-on collision airbag deployable in response to detection of a head-on collision of the vehicle, wherein
 the airbag controller deploys the head-on collision airbag in response to the collision direction detector detecting the substantially forward collision of the vehicle.

3. The vehicle airbag apparatus according to claim 1, wherein
 in response to the collision direction detector detecting a substantially side collision of the vehicle, the airbag controller deploys the curtain airbag in such a manner as to disable the deployment inhibitor to cancel suppression of the deployment of the curtain airbag over the area interfering with the extending portion of the seat belt.

4. The vehicle airbag apparatus according to claim 3, further comprising a head-on collision airbag deployable in response to detection of a head-on collision of the vehicle, wherein
 the airbag controller deploys the head-on collision airbag in response to the collision direction detector detecting the substantially forward collision of the vehicle.

5. A vehicle airbag apparatus comprising:
 a curtain airbag deployable in an interior of a vehicle from an upper portion on a side of the vehicle so as to cover a side window of the vehicle;
 a detector configured to detect a collision direction of a collision object and the vehicle; and
 circuitry configured to
  partially suppress deployment of the curtain airbag, and
  in response to the detector detecting a substantially forward collision of the vehicle, deploy the curtain airbag in such a manner as to suppress deployment of the curtain airbag over an area interfering with an extending portion of a seat belt being worn by an occupant.

* * * * *